United States Patent Office 3,458,285
Patented July 29, 1969

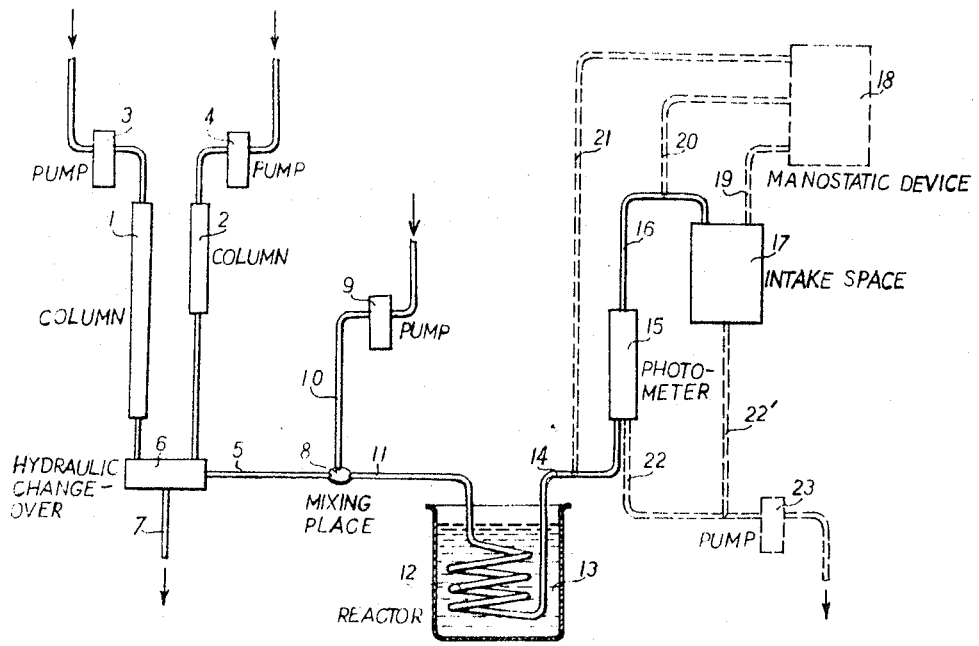

3,458,285
METHOD OF REDUCING THE UNDESIRABLE DECREASE OF THE CONCENTRATION GRADIENTS
Jiri Hrdina, Prague, Czechoslovakia, assignor to Ceskoslovenska Akademie Ved, Prague, Czechoslovakia, a corporation of Czechoslovakia
Filed Mar. 16, 1966, Ser. No. 534,766
Claims priority, application Czechoslovakia, Mar. 26, 1965, 2,023/65
Int. Cl. G01n 31/08, 31/22, 21/06
U.S. Cl. 23—230
3 Claims

ABSTRACT OF THE DISCLOSURE

A method for chromatographic analysis of a mixture of a liquid with an indication agent in a tubular system including a reactor whereby the pressure in the system is maintained higher than the ambient pressure and the reaction temperature of the mixture is increased above its boiling point at 760 mm. Hg so that the decrease in the concentration gradients is minimized by substantially reducing the reaction time and the flow path in the system.

---

The invention relates to a method of reducing the undesirable decrease of the concentration gradients in a throughflowing liquid capable of a reaction with an indicating agent after the mixture has been separated into individual constituents by a partition method, for example column chromatography, and the eluate entraining the separated constituents through a through-flow reactor being evaluated together with the indicating reagent.

The invention relates especially to the application of this method to the reduction of the undesirable decrease of the concentration gradients in a throughflowing mixture of amino acids separated by means of cation exchange resin column chromatography with the evaluation of the eluate composed of elution buffers and entraining the separated constituents in a throughflow reactor together with a ninhydrine reagent.

In modern continuous methods of evaluation of the eluate, a certain, frequently very substantial decrease of the concentration gradients in throughflowing liquids separated by means of columns takes place in consequence of the hydraulic processes involved by the flow through an evaluating device. Indication reactions, above all the colour-forming ninhydrine reaction, offer on one hand the advantage of a general sensitiveness, but on the other hand involve an undesirable decrease of the concentration gradients in the throughflowing mixture or liquids already divided into individual components mainly because an indication reaction requires a certain time to proceed to a sufficiently advanced degree necessary for obtaining for example a sufficient molecular extinction; such certain time is just as well required in order to reach states sufficiently insensitive to small variations of the external conditions, for example variations of pressures, frequency used in electric mains, aging of the chemicals etc. which cannot be prevented without excessive complications of the whole device.

The realization of the required reaction time for the ninhydrine reaction if accomplished in continuous-flow analysers by leading the reaction mixture through a capillary placed in an environment maintaining an elevated temperature. In standard types the time of the reaction and, consequently, also that of the flow through the reactor, is required to be about 15 min. at 100° C. This is usually realized by leading the reaction mixture of the eluate, flowing in at the rate of approximately 30 ml. per hour, and of the ninhydrine reagent, flowing in as a rule at the rate of 15 ml. per hour, through a reaction capillary of a bore of 0.7 mm. and a length of approximately 30 m. submerged into a bath of a temperature of 100° C., which arrangement complies with the principle of the capillary reactor.

Such a flow through the reactor naturally involves a considerable decrease of the concentration gradients of the components separated by means of chromatographic columns. In view of this decrease of the concentration gradients it would be of no use in standard types of analysers to make the columns particularly effective, since under current traditional circumstances given above a considerable decrease of the concentration gradients in the reactor is inevitable. Sometimes this decrease of the concentration gradients may be reduced by using for the passage through the reactor instead of a continuous flow of the basic medium, formed by the above mentioned mixture of eluate and ninhydrine reagent, a flow of this medium divided into mutually separated sections alternating with sections of for example some gaseous medium which was introduced continuously or forced in precise doses into the capillary tubing before the reactor. In both cases a significant improvement of the total result can be accomplished by substantially increasing the reaction rate and thus also shortening the time of the reaction and the required path of the medium in the reactor by using the method and apparatus according to this invention.

In accordance with the invention, in order to shorten the flow path, the indication reaction is accelerated by raising the temperature to a value exceeding the boiling point of the reaction mixture at 760 mm. Hg and by, using a pressure exceeding that of the outer atmosphere; in the case of a chromatographic separation of amino acids, the colorimetric ninhydrine reaction is accelerated for the purpose of shortening the flow path by raising the reaction temperature above 100° C. at a pressure exceeding that of the outer atmosphere.

Such a substantial reduction of the length of the reaction capillary involves the required substantial reduction of the undesirable decrease of the concentration gradients of the constituents separated by means of chromatographic columns, thus suppressing the undesirable effect of the reactor. More effective columns can therefore conveniently be used without the danger that an increase of their partition effect will be practically annulled by the subsequent decreases of the concentration gradients by the action of the reactor. In this way a manifold improved effect of the invention is attained and thus also a very significant positive effect of the invention on the resulting effectiveness of the entire analyser.

In the method according to the invention the pressure within the apparatus is raised by at least 5% above that of the outer atmosphere and the reaction temperature is increased by more than 5% above the boiling point of the reaction mixture at 760 mm. Hg.

The reaction temperature is conveniently maintained at a constant level by submerging the reaction space into a thermostatic bath of a liquid boiling above 100° C. According to a special type of the method according to the invention, the mixture may flow off into a super-atmospheric pressure space or into a pressure-free space over a device maintaining the reactor and the spaces connected with it at the atmospheric pressure. The evaluated eluate may be sucked off at a programmed rate, possibly discontinuously in separated amounts by means of a pumping device. The pressure in the reactor and in the spaces connected with it may be maintained by connecting them to a super-atmospheric pressure space.

The principle of the invention consist therein that the reaction tubing is maintained at a reaction temperature higher than the boiling point of the reaction mixture at 760 mm. Hg and that possibly even the spaces connected to this reaction tubing are connected to a device for maintaining in the reaction tubing a pressure higher than the pressure of the environment.

The drawing shows schematically an example of a device using the method according to the invention, the parts thereof that can alternatively be used being represented by dashed lines.

The drawing shows in particular an example of a device for the application of the invention in an analyser of mixtures of amino acids and similar substances, in which the flow of the eluate from individual columns and of the ninhydrine reagent is continuous. The device comprises colums 1 and 2 through which buffers are forced by means of pumps 3 and 4. The eluates from these two columns are succesively connected to the tubing 5 by means of a hydraulic switch 6 which connects one of the columns, from which the eluate is just not processed in the evaluating device, into the discharge 7. In the place 8 the eluate entering through the tubing 5 from the columns is mixed with the ninhydrine reagent which the pump 9 feeds through the tubing 10. In a continuing tubing 11 the mixture of eluate and ninhydrine reagent flows towards the capillary reactor whose reaction capillary 12 is submerged into a bath 13 of a temperature of over 100° C. The mixture after the reaction is led through a tubing 14 to a photometer 15, as a rule a multi-channel one, wherefrom the mixture flows through a tubing 16 into a retention space 17 in which a not represented device 18 with a manostatic function maintains the required overpressure.

The manostatic device drawn by a dashed line 18 may be connected to the retention space 17 by tubing 19, or possibly by tubings 20 or 21 to tubings 16 or 14.

From the manostatic device 18 an unrepresented device may possibly take the respective separating medium for the creation of separated parts of the divided flow of the medium by means of parts of the other medium.

A pumping device 23 may continuously or discontinuously pump off the content from the evaluating photometer 15 through tubing 22 or from the retention space 17 through tubing 22'.

The apparatus for carrying out the method according to the invention is naturally not confined to the example shown. Thus for example both columns 1 and 2 can be fed from a single pump over a change-over cock, more than two columns or a single one may be used, and prior to the evaluating device may be connected, already said, a device dividing the continuous flow of the medium by means of bubbles or drops into individual mutually separated sections.

I claim:

1. In the method for chromatographic analysis of a mixture of a liquid with an indication agent in a tubular system including a reactor the improvement comprising the steps of maintaining in the tubular system a higher pressure than the ambient pressure and increasing the reaction temperature of the mixture above its boiling point at 760 mm. Hg thus minimizing the decrease in the concentration gradients of the mixture by substantially reducing the reaction time and the flow path in the system.

2. In the method according to claim 1 applied to a mixture of amino acids separated into its individual components by means of cation exchange resin column chromatography to evaluate the eluate composed of elution buffers and entraining the separated constituents through a through-flow reactor together with a ninhydrine reagent, the improvement comprising a reaction temperature above 100° C. at a pressure above the atmospheric pressure.

3. A method according to claim 1 wherein the reaction space is submerged into a thermostable bath of a liquid boiling at an elevated temperature to maintain the reaction temperature at a constant level.

References Cited

UNITED STATES PATENTS

| 3,010,798 | 11/1961 | Whiteheat et al. | 23—253 XR |
| 3,074,784 | 1/1963 | Ferrari | 23—230 XR |
| 3,097,927 | 7/1963 | Skeggs | 23—230 |
| 3,098,717 | 7/1963 | Ferrari | 23—253 XR |
| 3,334,969 | 8/1967 | Catravas | 23—230 |
| 3,341,299 | 9/1967 | Catravas | 23—230 |
| 3,366,148 | 1/1968 | Taft et al. | 23—253 XR |

MORRIS O. WOLK, Primary Examiner

R. E. SERWIN, Assistant Examiner

U.S. Cl. X.R.

23—253; 73—61.1